United States Patent [19]

Tresch et al.

[11] 4,241,282

[45] Dec. 23, 1980

[54] SMOKE DETECTOR WITH BIMETALLIC ELEMENT FOR TEMPERATURE COMPENSATION

[75] Inventors: Erwin Tresch; Jürg Muggli, both of Männedorf, Switzerland

[73] Assignee: Cerberus AG, Männedorf, Switzerland

[21] Appl. No.: 951,784

[22] Filed: Oct. 16, 1978

[30] Foreign Application Priority Data

Nov. 21, 1977 [CH] Switzerland ....................... 14117/77

[51] Int. Cl.[3] ............................................ G01N 15/06

[52] U.S. Cl. .................................... 250/574; 356/338

[58] Field of Search ................ 340/630; 250/573, 574, 250/575; 356/438, 338, 342

[56] References Cited

U.S. PATENT DOCUMENTS 3,430,220 2/1969 Deuth .................................. 250/574

3,992,102 11/1976 Kajii .................................... 250/574

*Primary Examiner*—David C. Nelms

*Attorney, Agent, or Firm*—Werner W. Kleeman

[57] ABSTRACT

A smoke detector having a radiation source operating in the infrared, visible or ultraviolet wavelength region, transmitting radiation throughout an expanded or extended solid angle region of predetermined minimal extent. A radiation receiver is arranged externally of this radiation region for the reception of radiation which has been scattered at smoke particles and for signal transmission upon exceeding a predetermined smoke density. To compensate for decrease in smoke sensitivity of the smoke detector with temperature increase there is provided a bimetallic strip which, in the presence of a temperature increase, gradually moves into a small part of the radiation region and causes an additional irradiation of the radiation receiver. By suitable selection and arrangement of the bimetallic element the smoke sensitivity remains almost constant up to a predetermined critical temperature, or the smoke sensitivity gradually increases with increasing temperature.

10 Claims, 3 Drawing Figures

SMOKE DETECTOR WITH BIMETALLIC ELEMENT FOR TEMPERATURE COMPENSATION

CROSS-REFERENCE TO RELATED APPLICATIONS

Reference is made to the related commonly assigned, copending U.S. application Ser. No. 777,397, filed March 14, 1977, now U.S. Pat. No. 4,181,439, granted Jan. 1, 1980 and Ser. No. 777,396, filed Mar. 14, 1977, now U.S. Pat. No. 4,175,865, granted Nov. 27, 1979 each entitled "Smoke Detector" and each listing Erwin Tresch and Zoltan Horwath as inventors.

BACKGROUND OF THE INVENTION

The present invention relates to a new and improved construction of a smoke detector having a radiation source which transmits radiation in a radiation region encompassing an expanded or extended solid angle region. At least one radiation receiver is arranged externally of the direct radiation region of the radiation source and receives radiation which is scattered at smoke particles in the radiation region. An evaluation circuit is connected with the radiation receiver for signal transmission when the radiation received by the radiation receiver has exceeded a predetermined value.

With such type smoke detectors, as the same have been employed for instance in the fire detection art, the radiation, depending upon the nature of the smoke particles to be detected, can be selected so as to be within the visible, infrared or ultraviolet wavelength region. The solid angle region of the transmitted radiation and the arrangement of the radiation receiver are advantageously selected such that there is realized as good as possible efficiency, i.e., the receiver already is capable of taking-up as much as possible of the scattered radiation even with low smoke density. A suitable construction of smoke detector for this purpose has been disclosed, for instance, in Swiss Pat. No. 592,932 and the aforementioned related, commonly assigned U.S. application Ser. No. 777,397, now U.S. Pat. No. 4,181,439. Evaluation circuitry suitable for such smoke detector and that of the present invention have been disclosed in the commonly assigned U.S. Pat. No. 3,760,395, granted Sept. 18, 1973 and Swiss Pat. No. 520,990. The disclosure of the foregoing patents and applications is incorporated herein by reference.

Such smoke detectors are, however, associated with the drawback that their sensitivity decreases with increasing temperature. This phenomenon is primarily predicated upon characteristic changes of the employed components in the presence of a temperature increase, especially due to the reduction in the sensitivity of standard radiation receivers above a certain permissible maximum temperature and owing to the reduction of the radiation output of conventional semiconductor-light sources with increasing temperature. To highlight this, there has been shown in accompanying FIG. 2, based upon the curve A, this reduction of the smoke sensitivity of a prior art smoke detector as a function of the temperature T. The ordinate d represents the smoke concentration at which such smoke detector delivers a signal. It will be seen that the smoke density d needed for signal transmission already rises slightly above 30° C., i.e., the smoke detector becomes less sensitive.

In practice this leads to the result that in the case of a fire accompanied by a rapid temperature increase such smoke detector first responds too late or not at all. In order to nonetheless ensure that there will be transmitted an alarm signal, it is known, in the smoke detector art, from U.S. Pat. Nos. 3,226,703 and 3,555,532 to provide an additional temperature switch or contact.

It is also already known to use a bimetallic strip in a smoke detector for signal transmission upon exceeding a predetermined maximum temperature. Such an arrangement has been disclosed in U.S. Pat. No. 3,430,220, granted Feb. 25, 1969 to Albert Deuth. The scattered light smoke detector therein disclosed has the light emitted by a lamp screened by means of a diaphragm to such an extent that there is formed a narrowly confined, almost point-like radiation region from which a photocell receives the radiation scattered by the smoke particles. Within the detector housing there is provided the bimetallic strip which slowly bends in the presence of a temperature increase. Upon reaching a predetermined threshold temperature this bimetallic strip moves quite suddenly into the radiation region of the lamp, so that the light which is reflected and scattered at the surface of the bimetallic element tends to superimpose upon the light that is scattered by the smoke and impinges at the photocell. Since this sudden moving or rocking of the bimetallic element into the radiation region occurs at a certain critical temperature, the irradiation of the photocell or photoelement likewise is suddenly increased and at this critical temperature there is triggered an alarm. However, what is disadvantageous with this prior art construction is that prior to reaching this critical temperature the sensitivity of this described smoke detector decreases, which, in turn means that with increasing temperature, prior to reaching the critical threshold, there is initially required an increasingly greater smoke density for triggering an alarm. This sensitivity decrease with increasing temperature is, however, totally undesired in practice, since upon occurrence of a fire, practical experience has shown that the development of smoke also usually is accompanied by a temperature increase. Such state-of-the-art fire alarms are afflicted with the drawback that when encountering this situation, as frequently occurs in practice, they first trigger an alarm signal too late in time. The slow sensitivity decrease of such smoke detectors, which already begins slightly above the room temperature, in other words already considerably below the critical maximum temperature of say around 70° C. for instance, is in no way overcome.

It is also known to the art, for instance from U.S. Pat. No. 3,469,250 and British Pat. Nos. 1,485,790 and 1,486,535, to construct the electrical circuit, by using temperature-sensitive elements, for instance thermistors, such that the threshold value of the output signal of the radiation receiver, at which there is triggered a signal, is reduced with increasing temperature. Such evaluation circuit requires, however, an increased number of components and is therefore correspondingly costly and prone to disturbances.

SUMMARY OF THE INVENTION

Therefore, with the foregoing in mind it is a primary object of the present invention to provide a new and improved construction of smoke detector which is not associated with the aforementioned drawbacks and limitations of the prior art proposals.

Still another and more specific object of the present invention aims at avoiding or at least minimizing the aforementioned drawbacks of state-of-the-art smoke detectors, and particularly, providing a smoke detector wherein the sensitivity decrease during temperature increase can be avoided in a most simple and positive manner and without the necessity of complicating the evaluation circuitry.

A further significant object of the present invention aims at the provision of a new and improved construction of smoke detector which is relatively simple in design, relatively economical to manufacture, extremely reliable in operation, not readily subject to breakdown or malfunction, and requires a minimum of maintenance and servicing.

According to important aspects of the invention the smoke detector of this development is manifested by the features that there is provided a bimetallic element which is structured such and arranged with respect to the radiation region of the radiation source such that in the presence of a temperature increase it gradually moves into a part or fraction of the radiation region, and thus, gradually increases the irradiation or impingement of the radiation receiver as a function of the temperature due to the radiation reflection and/or radiation scattering at its surface. Consequently, there is at least compensated the sensitivity decrease of the smoke detector with increasing temperature over a predetermined region of the temperature range within which the smoke detector should respond, such as through a region of at least 20° C. for instance, but preferably through a region encompassing between room temperature and about 70° C. to 80° C. by way of example.

Instead of altering the electrical circuit, along with the accompanying drawbacks, in the case of the invention there is increased the irradiation of the radiation receiver as a function of the temperature increase, i.e. with elevated temperature a low smoke density or scattered radiation intensity is adequate to trigger an alarm signal. The dependency of the irradiation or impingement of the radiation receiver upon the temperature can be controlled by suitable selection and arrangement of the bimetallic element, for instance such that the smoke sensitivity of the entire smoke detector remains almost constant up to approximately a critical temperature, which for instance can be chosen in the neighborhood of about 70° C. and upon exceeding this critical temperature immediately triggers an alarm signal (curve B of FIG. 2). Instead of the foregoing it can, however, also be advantageous to control the irradiation of the radiation receiver such that the sensitivity gradually increases with increasing temperature. Such smoke detector thus responds more rapidly at elevated temperature than at lower temperature. Consequently, there is insured for as early as possible giving of an alarm in the event of encountering a danger condition necessitating doing so.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
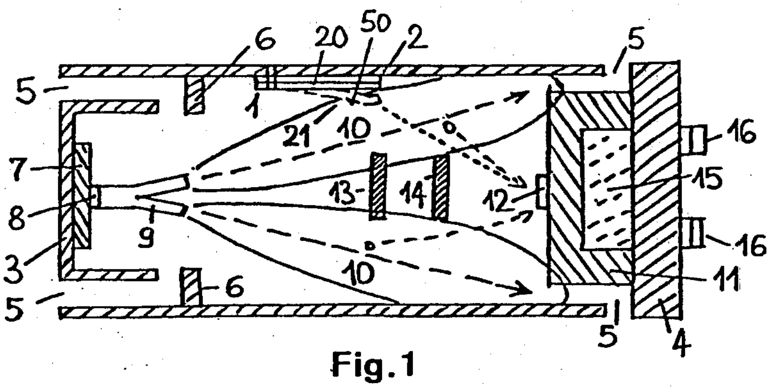
FIG. 1 schematically illustrates in sectional view a first exemplary embodiment of smoke detector constructed according to the teachings of the present invention.

Describing now the drawings, it is to be understood that the smoke detector of the present development is an improvement upon the smoke detector of the aforementioned U.S application, Ser. No. 777,397, filed Mar. 14, 1977, now U.S. Pat. No. 4,181,439, granted Jan. 1, 1980 to which, as mentioned, reference may be readily had and the disclosure of which is incorporated herein by reference. More particularly, by referring to FIG. 1 the exemplary embodiment of smoke detector shown therein will be seen to comprise a substantially tubular-shaped housing 2 enclosing a measuring space or chamber 1. The tubular-shaped housing 2 is closed at both ends by the base plates 3 and 4 in such a manner that between the housing 2 and these base plates 3 and 4 there are formed substantially ring-shaped inlet openings 5 for the entry of the ambient air into the measuring space or chamber 1. Baffles 6 or equivalent structure can be arranged behind the inlet openings 5 in order to prevent the entry of direct light from the outside into the measuring space or chamber 1. A support or carrier element 7 for a suitable radiation source 8 is mounted at base plate 3. In principle, this arrangement can be carried out in any random or optional fashion, for instance the radiation source 8 can be an incandescent lamp or a discharge lamp. However, it has been found to be particularly advantageous to select radiation sources having small dimensions, the radiation of which can be easily focused or those which inherently emit radiation in preferred directions. In this respect light-emitting semiconductors, for instance laser diodes, have been found to be particularly suitable. In the case of smoke detectors used for fire alarm purposes there can be advantageously employed, by way of example, gallium arsenide diodes. Through the use of optical means the transmitted radiation is deflected into a desired solid angle region. In the illustrated example through the use of a suitable optical system 9 and screening diaphragms 13 and 14 there is achieved the result that the radiation region of the radiation source has imparted to it the form of a substantially conical ring or cone jacket 10 extending about the lengthwise axis of the smoke detector i.e. the housing 2.

Mounted at the opposite base plate 4 is a further support or carrier element 11 for the radiation receiver 12. The radiation receiver 12 is located essentially along the lengthwise axis of the smoke detector so that it is practically not impinged or irradiated by direct radiation from the radiation source 8, however receives radiation which has been forwardly scattered out of the conical-shaped zone 10 by particles located within the measuring chamber 1. In this way it is possible, with a single radiation receiver 12, to detect a larger radiation scattering region than such is possible with other state-of-the-art smoke detectors, and specifically, especially that solid angle region in which the scattered radiation possesses a particularly large intensity. Such smoke detector thus has increased sensitivity.

Now in a hollow space 15 of the support element 11 there is arranged the control and evaluation circuit for the radiation source 8 and the radiation receiver 12.

Control and evaluation circuits suitable for the purposes of the invention are well known in this particular field of technology and are available in random circuit designs which are readily compatible for use with the smoke detector of the present invention without necessitating any alterations. For instance, there can be used a well known coincidence circuit of the radiation source 8 and the radiation receiver 12. One possible form of control and evaluation circuit which can be used has been disclosed, for instance, in the previously cited, commonly assigned U.S. Pat. No. 3,760,395 granted Sept. 18, 1972, also Swiss Pat. No. 520,990 to which reference may be readily had and the disclosure of which is incorporated herein by reference. The circuit is further connected with contacts 16 arranged at the outside of the base plate 4 and which can be connected to lines or conductors leading to a central signal station to which there is delivered a signal as soon as the smoke density in the measuring chamber 1 exceeds a predetermined value.

According to important aspects of the invention, a bimetallic strip 20 is arranged at a part of the housing wall 2 externally of the radiation region 10, and specifically in such a manner that at normal room temperature it is located completely outside of the radiation region 10. However, in the presence of a temperature increase this bimetallic strip 20 bends such that its free end 21 moves into the radiation region 10. By reflection and/or scattering at the strip end 21 the radiation receiver 12 is additionally impinged or irradiated with radiation. By suitable selection of the radiation distribution in the radiation region 10 and the movement of the bimetallic strip 20 in the presence of a temperature increase, there is achieved the beneficial result that this additional radiation of the radiation receiver 12 gradually increases with increasing temperature. It is desirable for the radiation to be focused at a focusing ring, generally indicated by reference character 50 in FIG. 1, and for the bimetallic element or strip 20 to influence, for instance, at most one-tenth of the circumference of such focusing ring.

Figure 2:
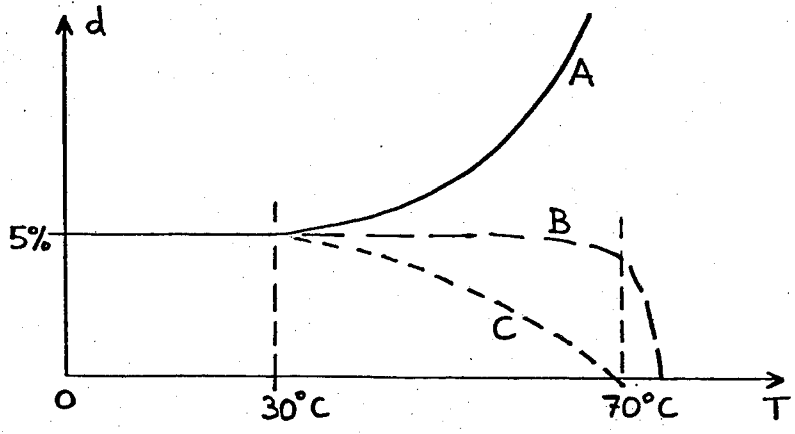
FIG. 2 illustrates various graphs depicting sensitivity changes of different smoke detectors as a function of temperature, useful for explaining the mode of operation of the inventive smoke detector.

Now in FIG. 2 there is illustrated the dependency of the smoke density d required for signal transmission upon the temperature T for different smoke detectors. Curve A represents a prior art smoke detector without any additional bimetallic element. It will be seen that the smoke density d which is needed for the giving of signals markedly increases already slightly above the room temperature, i.e., the smoke sensitivity of the smoke detector correspondingly markedly decreases. By suitable selection and mounting of the bimetallic strip 20 in the exemplary embodiment of the invention according to FIG. 1, it is, however, possible to achieve the beneficial result that the smoke detector has a characteristic corresponding to the curve B, wherein, it will be observed, the smoke sensitivity remains practically constant over a predetermined temperature range or region, in this case between about room temperature and an increased critical temperature, for instance amounting to about 70° C., and upon exceeding this critical temperature drops to null, i.e., in this case immediately delivers an alarm signal even without the presence of any smoke. In this manner it is possible to almost completely compensate the sensitivity reduction of such smoke detector with increasing temperature, and specifically, up to a critical temperature range at which, in any event, an alarm signal must be given. It is also possible, by suitable selection and arrangement of the bimetallic element or strip 20, to obtain an over-compensation, as the same has been illustrated by the curve C. Hence, the sensitivity increases with increasing temperature, so that at elevated temperature an alarm signal is triggered even with smaller smoke density.

Figure 3:
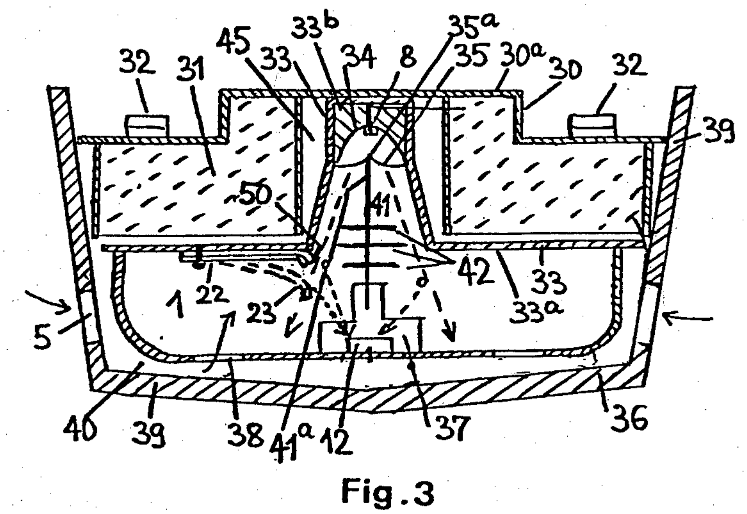
FIG. 3 is a schematic sectional view of a further exemplary embodiment of smoke detector constructed according to the teachings of the present invention.

FIG. 3 illustrates a further exemplary embodiment of the invention which is manifested by its particularly simple construction and corresponding easy and uncomplicated mounting. In this example the base or socket portion 30, at whose top surface **30*a* there are provided contacts 32 which, for instance, can be structured as bayonet locking elements, serve for the connection of the smoke detector with signal lines or conductors which lead to a central signal station. In the hollow spaces 31 there are arranged, for instance embedded by casting, components of an electrical control and evaluation circuit of known design, as for instance disclosed heretofore with respect to the arrangement of FIG. 1. In a central bore 45 of the socket or base portion 30 there is mounted an element 33 which at its edge 33*a* is disk-shaped and at its center 33*b* is pot-shaped, this element or part 33 centrally containing the radiation source 8 together with an associated optical system, i.e., for instance a reflector 34 and a lens surface or lens element 35**. This optical system can be designed, for instance, such that there is formed a conical ring-shaped or conical jacket-shaped radiation characteristic, as disclosed more fully in the aforementioned U.S. application Ser. No. 773,397, now U.S. Pat. No. 4,181,439.

At the disk-shaped edge **33*a* of this pot-shaped part 33 there is mounted a hood-shaped part 36. The pot-shaped part 33 and the hood-shaped part 36 enclose the measuring space or chamber 1. In order to allow entry of the ambient air into the measuring chamber 1 there are provided a number of openings 38 at the hood-shaped part or element 36. At the inside there is mounted at the central region of this part or element 36 a transparent body 37. The transparent body 37 encloses the radiation receiver 12 in such a manner that there can impinge, at the radiation receiver 12, the scattered radiation emanating from the entire half-space. At the center of the transparent part 37, formed of for instance a suitable plastic, there is inserted a pin-shaped structure 41 carrying a number of screens or diaphragms 42 or equivalent structure for screening the direct radiation from the radiation receiver 12. The free end 41*a* of this pin 41 presses into a recess 35*a* of the rotational surface 35 of the radiation source 8** and thus fixes the individual parts relative to one another.

Mounted upon the entire structure is a housing 39 in which there are provided openings 5 for entry of air into the housing interior. These openings or apertures 5 in the housing 39 are offset in relation to the openings or apertures 38 in the hood-shaped part or element 36 to such an extent that it is not possible for light to directly penetrate from the outside into the measuring space or chamber 1, but, on the other hand, however the ambient air after flowing through the intermediate space 40 between the housing 39 and the hood-shaped part 36 can enter through the openings 38 into the measuring chamber 1. Also with this exemplary embodiment there is provided a bimetallic element or strip 22 which is attached at the disk-shaped part 33 in such a manner that when encountering normal temperatures it is located outside of the radiation region of the radiation source 8. In the presence of a temperature increase the bimetallic element or strip 22 bends however and its free end 23 extends into the radiation region as previously explained, so that at this free end 23 the reflected or scattered radiation additionally arrives at the radiation receiver 12. Also with this embodiment the bimetallic element or strip 22 is constructed and arranged such that with increasing temperature there arises a gradually increasing additional irradiation or impingement of the radiation receiver 12 and there can be obtained a characteristic for instance corresponding to curve B or curve C of FIG. 2.

According to a practical exemplary embodiment of the invention, and with a smoke detector of the type shown in FIG. 5 of the previously cited, commonly assigned U.S. Pat. application Ser. No. 773,397, filed Mar. 14, 1977, now U.S. Pat. No. 4,181,439, corresponding to the arrangement of FIG. 3, and with a housing diameter of about 7 cm, there was provided a bimetallic element or strip 22 having a length of about 4 cm, a thickness of about 0.2 mm and a width of about 4 mm. Both layers of the bimetallic strip were formed of an iron-nickel alloy, and specifically, one side or face had a nickel content of approximately 20% by weight and the other side had a nickel content of about 45% by weight. With such bimetallic element 22 fixed at one end, the edge of the free end 23 moved through a distance of about 5 mm upon encountering a temperature increase from 20° C. to about 60° C. The surface of the bimetallic element was lacquered so as to be dull black, and thus, the reflection capability only amounted to a few percent. Since the conical ring-shaped radiation region, with this embodiment, at the site of the bimetallic element 22 possessed at its periphery or circumference an expansion or elongation of somewhat more than 10 cm, the bimetallic element 22 only affected less than one-tenth of such radiation region, i.e. its circumference. The correct adjustment of the bimetallic element or strip, in order to obtain a sufficient temperature compensation of the sensitivity decrease of the smoke detector, was accomplished by suitable displacement outwardly in radial direction of the attachment point of the bimetallic element or strip. In this way, depending upon the desired field of application, i.e. the external temperature to be expected upon use of the smoke detector, there could be determined the correct point of attachment for compensation or also over-compensation of the temperature course.

In order to obtain as good as possible adjustability of the additional irradiation by means of the action of the bimetallic element, it is advantageous to select such additional irradiation in the same order of magnitude as the scattered radiation for the smoke density needed for triggering a signal. Since, however, the intensity of the radiation which is reflected or scattered at the bimetallic element is greater by a multiple than the scattered radiation at the smoke particles, it is advantageous to select the bimetallic elements such that it only detects a small part of the radiation region of the radiation source, for instance less than one-tenth of the radiation region, as previously explained. On the other hand, it is advantageous to design the radiation region of the radiation source such that the same encompasses an expanded or enlarged solid angle region. It has been found that such type smoke detector having an enlarged radiation region, for instance having a cone ring-shaped or cone jacket-shaped radiation characteristic and an additional bimetallic element which only influences an extremely small part of this radiation region, reliably and simply enables obtaining compensation of the temperature variations to the smoke sensitivity.

Finally, by way of completeness it is mentioned that a further advantage of the arrangement according to the above-described exemplary embodiments is that the bimetallic element and the components responsible for the sensitivity decrease have different thermal inertia. As a result, the bimetallic element heats up more rapidly than the other components, and therefore the sensitivity course changes with rapidly increasing temperature. While with slowly increasing temperature there results, for instance, a sensitivity course according to curve B of FIG. 2, with rapid temperature increase the sensitivity curve shifts so as to approximately have the configuration of the curve C of such FIG. 2. This means that with rapid temperature increase there is required a smaller smoke density for triggering an alarm than in the case of slow temperature increase. This effect is extremely desired in practice, since, in any event, a rapid temperature increase in an area or room is a signal that a fire has broken out and, therefore, there is desired an earlier triggering of an alarm, whereas a slower temperature increase also can be attributed to, for instance, a change of the outside or ambient temperature, the action of radiators and other heater bodies, and so forth. A smoke detector designed according to the teachings of the invention not only is capable of positively triggering an alarm at a critical maximum temperature, but furthermore, also has a certain differential effect, in other words, the sensitivity is altered as a function of the speed of increase of the temperature.

While there are shown and described present preferred embodiments of the invention, it is to be distinctly understood that the invention is not limited thereto, but may be otherwise variously embodied and practiced within the scope of the following claims. Accordingly,

What we claim is:

1. A smoke detector comprising:

a radiation source for transmitting radiation to a predetermined radiation region having an extended solid angle region;

at least one radiation receiver arranged externally of a direct radiation region of the radiation source for receiving radiation scattered by smoke particles in the predetermined radiation region;

a bimetallic element structured and arranged so that in the presence of a temperature increase it gradually moves into a fraction of the radiation region and gradually increases the irradiation of the radiation receiver as a function of the temperature owing to at least any one of reflection or scattering of radiation at the surface of the bimetallic element which extends into the fraction of the radiation region, to thereby at least compensate over a predetermined temperature range lying between normal room temperature and a predetermined critical temperature the sensitivity decrease of the smoke detector with increasing temperature.

2. The smoke detector as defined in claim 1, wherein:

the bimetallic element is structured and arranged such that the additional irradiation of the radiation receiver by means of the bimetallic element is accomplished at an increased temperature such that the sensitivity change of at least any one of the radiation receiver and radiation source are at least approximately compensated up to said predetermined critical temperature.

3. The smoke detector as defined in claim 1, wherein:

the bimetallic element is structured and arranged such that the additional irradiation of the radiation receiver by means of the bimetallic element is accomplished in a manner such that the smoke density at which the smoke detector triggers a signal is reduced with increasing temperature.

4. The smoke detector as defined in claim 1, wherein: the bimetallic element is structured and arranged such that at a temperature increase it influences less than one-tenth of the circumference of the radiation region.

5. The smoke detector as defined in claim 1, wherein: the radiation region of the radiation source has the shape of a substantially conical ring.

6. The smoke detector as defined in claim 1, wherein: the radiation region of the radiation source essentially has the shape of a cone jacket.

7. The smoke detector as defined in claim 1, wherein: the bimetallic element, in the presence of a temperature increase, gradually moves within the radiation region towards a region of greater radiation intensity.

8. The smoke detector as defined in claim 1, wherein: said predetermined temperature range encompasses at least about 20° C.

9. The smoke detector as defined in claim 1, wherein: said predetermined temperature range encompasses between about room temperature and about 80° C.

10. A smoke detector comprising:

a radiation source for transmitting radiation into a radiation region having an expanded solid angle region of predetermined minimum extent;

at least one radiation receiver arranged for receiving radiation scattered by smoke particles in the radiation region;

a bimetallic element positioned to cooperate with the radiation region such that in the presence of a temperature increase it gradually moves into part of the radiation region and progressively increases the irradiation of the radiation receiver as a function of the temperature owing to at least any one of reflection or scattering of radiation at the surface of the bimetallic element which extends into said part of the radiation region.

* * * * *